(12) United States Patent
Smith et al.

(10) Patent No.: US 8,293,664 B1
(45) Date of Patent: Oct. 23, 2012

(54) PROCESS FOR PRODUCING POLYVINYL ALCOHOL ARTICLES

(75) Inventors: Novis Smith, Philadelphia, PA (US); Charles Roberson, Greensboro, NC (US)

(73) Assignee: LakeLand Industries, Inc., Ronkonkoma, NY (US)

(*) Notice: Subject to any disclaimer, the term of this patent is extended or adjusted under 35 U.S.C. 154(b) by 0 days.

(21) Appl. No.: 13/135,917

(22) Filed: Jul. 18, 2011

(51) Int. Cl.
*B32B 5/02* (2006.01)
*B32B 27/04* (2006.01)

(52) U.S. Cl. ............ 442/85; 442/86; 442/378; 442/399

(58) Field of Classification Search ............... 442/85–86, 442/172–173, 394, 396, 136
See application file for complete search history.

(56) References Cited

U.S. PATENT DOCUMENTS

| 3,322,593 A | * | 5/1967 | Conti | 156/164 |
| 4,731,266 A | * | 3/1988 | Bonnebat et al. | 428/36.6 |

* cited by examiner

*Primary Examiner* — Lynda Salvatore
(74) *Attorney, Agent, or Firm* — John Lezdey

(57) ABSTRACT

A process for producing a polyvinyl alcohol film or fabric having a modified non-porous surface which can be used to form disposable protective clothing, wraps, and articles similar to TYVEK® by impinging steam on at least one surface.

7 Claims, 1 Drawing Sheet

PROCESS FOR PRODUCING POLYVINYL ALCOHOL ARTICLES

FIELD OF THE INVENTION

The present invention relates to a process for producing articles and garments with a modified polyvinyl alcohol film fabric having the utility of a film sold by DuPont de Nemours and Company under the trademark TYVEK® which is a non-woven spunbonded polyolefin.

BACKGROUND OF THE INVENTION

The prior art has recognizes uses for polyvinyl alcohol compositions in the manufacture of water soluble useful articles. For example, U.S. Pat. No. 3,413,229 which is incorporated herein by reference, teaches the production of water soluble bags or pouches for which packets or the like are produced containing such materials as detergents, bleaches, insecticides, medicinals, chemicals, dyes, pigments, industrial additives and other materials. It is taught that the contents of the packets are dispersed merely by dropping the packets into water whereupon the bags dissolve and release their contents into aqueous dispersions. However, the referenced patent teaches the production of such films which are both hot and cold water soluble.

U.S. Pat. No. 3,859,125, which is incorporated herein by reference, teaches the production of layered articles which include coatings of polyvinyl alcohol. The subject reference teaches coating polyvinyl alcohol on a paper membrane whereby it is taught that the coated paper is soluble in either high or low temperature water. Similarly, U.S. Pat. No. 4,343,133 teaches the coating of polyvinyl alcohol onto a non-woven fiber sheet impregnated with latices of polyvinyl acetate in the manufacture of a pre-moistened towelette which can be disposed of by flushing in plain water without danger of clogging a plumbing system.

Both U.K. Patent No. 1,187,690 and Japanese Patent No. 72041741, which are incorporated herein by reference, teach the production of stand alone polyvinyl alcohol films which are water soluble. The U.K. patent teaches the production of hospital bags and packaging material for such products as detergents and agricultural chemicals while the Japanese patent teaches the use of polyvinyl alcohol films to make laundry bags which dissolve releasing soiled garments contained therein. However, neither reference teaches the unique films of the present invention which can be configured into useful garments and like materials.

U.S. Pat. No. 4,272,851 to Goldstein discloses a protective garment of non-woven, spun bonded polyolefin manufactured by DuPont de Nemours & Co. which is coated on one side by a polyethylene film. The film provides tear resistance, and the film prevents chemical penetration. One of the problems is the cost of manufacture and the problem of scorching during manufacture of the film.

SUMMARY OF THE INVENTION

According to one embodiment, the present invention provides a process for modifying a film, fabric or laminate of polyvinyl alcohol (PVOH) to use alone or in a laminate to provide a film or fabric which can be formed into useful films, non-woven fabrics and articles.

More particularly, the process comprises impinging steam on a surface of a film of polyvinyl alcohol and to raise the temperature of the polyvinyl alcohol surface to about its glass transition temperature to soften the surface and cause it to become non-porous.

Advantageously, the processed polyvinyl alcohol is hot calendered into a film for other uses.

In accordance with another embodiment of the invention, the modified polyvinyl alcohol is manufactured into films, garments, wraps, fabrics, including pillow covers, linens, etc. where TYVEK® has been found to be useful.

It is therefore a general object of the invention to provide at least one surface of a woven or non-woven polyvinyl alcohol film or fabric with a non-porous surface by raising its temperature to its glass transition temperature to a controlled depth in presence of steam.

It is another object of the invention to provide a laminate with a surface layer that is non-porous by steam impingement.

It is a further object of the invention to provide wraps, garments and other useful articles with a transparent film having similar characteristics of TYVEK®.

It is a still further object of the invention to provide chemical protective garments and medical garments which are readily disposable after use.

It is yet another object of the invention to provide a process for producing polyvinyl alcohol woven or non-woven films or fabrics having a steam modified surface.

These and other objects and advantages will become more apparent for the Description of Preferred Embodiment and the following drawing.

DESCRIPTION OF THE PREFERRED EMBODIMENTS

Figure 1:
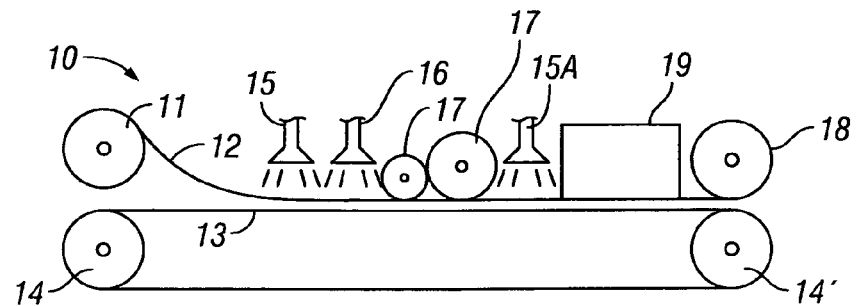
FIG. 1 is a schematic illustration of an apparatus which can be used in forming the modified polyvinyl alcohol of the invention.

According to one embodiment of the invention, the process for preparing the modified polyvinyl alcohol film, fabric or laminate can be accomplished using an apparatus illustrated in FIG. 1.

As shown in FIG. 1, a film, fabric or laminate (12) on a roller (11) is processed on an apparatus (10). The film comprises polyvinyl alcohol film, fabric or a laminate (12) placed on a conveyor (13) which is moved by rollers (14, 14$^1$) under a steam jet (15) wherein steam at a temperature of about 100-120° C. impinges on the polyvinyl alcohol film so as to raise the temperature of the surface to about the glass transition Tg so as to soften and form a pore free surface.

The treated film passes under a delivery means (16) which can deliver an additive such as a colorant or an anti-blocking agent such as silicon dioxide polymer, talc, fumed silica, etc in an amount between 0.1 to 5% (wt), preferably between 2 to 3% (wt). The film (12) then proceed under at least one heated calendar (17) to press the additives into the softened portion and/or to stretch the film.

After passing the calendar (17) having one or more rollers, a further delivery means (15A) can deliver a water repellent. Suitable water repellents are fluorocarbons offered by 3M Co., sold under the trademarks FC824 and 808. The materials are used in the range of between 0.1 to 2.0% (wt) based on the weight of polyvinyl alcohol polymer.

The treated film can be conveyed through a drying oven (19) and then onto a take-up roller (18). Both sides of the film (12) can be treated by further passing the film on roller (19) through the apparatus (10) to treat the other surface of the processed film (12).

The film (12) can be only polyvinyl alcohol with or without acetyl groups, and cross-linked or uncross-linked.

The film (12) may comprise a laminate formed with polyvinyl alcohol and another thermoplastic, preferably, polyethylene to provide added tear strength similar to TYVEK®.

Figure 2A:
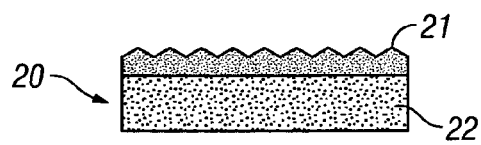
FIG. 2A is a cross-sectional view of a modified polyvinyl alcohol of the invention.

As shown in FIG. 2A a treated film (20) may comprise a portion (22) of polyvinyl alcohol with a surface layer (21) of the steam modified polyvinyl alcohol (21).

Figure 2B:
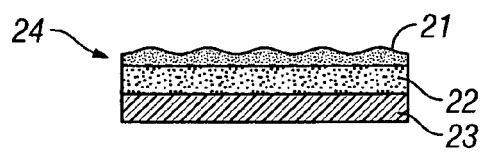
FIG. 2B is a cross-sectional view of a laminate of polyvinyl alcohol having a surface modification and a thermoplastic film.

As shown in FIG. 2B there is a film or fabric (24) which comprises a laminate having a layer of polyvinyl alcohol (22) with a surface layer (21) of a steam modified polyvinyl alcohol on one side and a different thermoplastic resin (23) such as polyethylene on the other side. This film arrangement is similar to TYVEK® and can be used in building construction.

Figure 3:
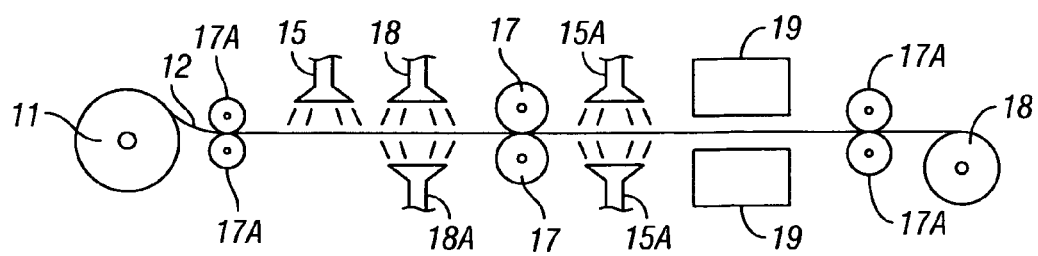
FIG. 3 is a modification of the apparatus of FIG. 1.

As shown in FIG. 3, the apparatus can have a steam jet (18A) on the underside of the film or fabric (12) so that both surfaces can be modified. Also tension rollers (17A) may be provided to stretch the film or fiber (12) depending upon its utility.

Polymer or sheet materials useful in practicing the present method comprise polyvinyl alcohol with or without acetyl groups, cross-linked or uncross-linked. The garments are comprised of polyvinyl alcohol homopolymer that has been highly oriented by post drawing or heat annealing. Ideal for use in the present invention would be a highly crystallized, at least approximately 98% saponified or hydrolyzed polyvinyl acetate. Commercially, polyvinyl alcohol sold under the trademark Vinex 1003™ and 1002™ by Air Products could be used herein. Useful PVOH fibers are typically 0.5 denier to 5.0 denier and are preferably from 1.0-2.0 denier and most preferably sized at 1.2-1.5 denier. A commercially available product for use in the present invention is either type T-B (VEE 1290) or type T-5 (VPB 101) which are each available from Kuralon as its PVA fiber. This material is sold in 44 mm lengths. The T-B product is sized at 1.2 denier while the T-5 product is sold in 38 mm staple lengths of 1.5 denier.

The fabric useful in practicing the present invention can be constructed by any well known technique for making woven, non-woven, knitted or otherwise formed fabric. Such non-woven techniques useful in practicing the present invention include spun bonding, melt blowing or wet laying, hydro entangling with cold water and/or thermally bonding with 30-70% of the surface melted to form essentially a non porous street surface. When products are configured of sheets of suitable thermoplastic material, the sheets are approximately 1 to 6 mils in thickness and more preferably 1 to 3 mils in thickness and most preferably approximately 1.5 mils in thickness. Suitable non-woven fabric or sheets are approximately from 15 g/yd$^2$ to 200 g/yd$^2$ in weight and more preferably from 20 g/yd$^2$ to 70 g/yd$^2$ and most preferably from 25 g/yd$^2$ to 80 g/yd$^2$.

As noted previously, polymer or sheet material useful in practicing the present invention is comprised of polyvinyl alcohol with or without acetyl groups, cross-linked or uncross-linked. It is proposed that the polyvinyl alcohol be substantially fully hydrolyzed, that is, having 98% or greater hydrolyzed acetyl groups.

For the sake of adequate mechanical strength, in some cases the polyvinyl alcohol-based non-woven fabric or sheet material should have a degree of polymerization of at least 700 and no greater than approximately 1500. Ideally, such materials should have a degree of polymerization of approximately 900 and be substantially crystallized.

To enhance the manufacture of suitable polyvinyl alcohol resin-based materials, suitable quantities of a plasticizer may be necessary. It is contemplated that up to 15% (wt.) of a suitable plasticizer such as glycerine or polyethylene glycol may be employed to assist in providing a smooth melt extrusion from the polyvinyl alcohol-based pellets.

It was found that the manufactured fabric for use as disposable medical garments displayed nearly identical physical properties similar to fabric manufactured from polyester and polypropylene. However, the fabric manufactured was unaffected by cool or warm water (23°-37° C.) but when exposed to hot water (80°-90° C.), immediately dissolved.

The incorporation of a water repellent within the polyvinyl alcohol film or fabric is quite a useful adjunct to minimize surface attack by liquid moisture at a temperature lower than that at which solubility occurs. It has been found that even with polyvinyl alcohol films and fabrics which become water soluble only at elevated temperatures, when exposed to water, the surface of such material tends to take on a slick "feel" and the use of water repellents tends to minimize this effect. Suitable repellents include fluorocarbons offered by the 3M Co. sold under its trademarks FC 824 and 808. These materials are useful in the range of between 0.1 to 2.0% (wt.) based upon the weight of the polyvinyl alcohol polymer.

Antimicrobial agents can add to the surface particularly for medical applications such as gowns, drapes, etc. Antimicrobials include GERM PATROL® sold by Germ Patrol, LLC, silanes, silver or copper antimicrobials, and the like.

A laminate can be formed with the modified polyvinyl alcohol and a film of a polyolefin, polyvinyl acetate, polyvinyl chloride, an ionomer, and the like.

The following Examples are merely illustrative of the invention and modifications are within those skilled those in the art.

The following Examples are illustrative of the invention.

Example 1

A non-woven polyvinyl alcohol fabric (20 mil thickness) was passed through a calendar as shown in FIG. 1 with the gap between the rolls set at 16 mils. The rolls were heated at 100° C. and a narrow slot of steam was directed at the fabric just before the fabric passed through the rolls. The treated fabric was reduced in thickness to 16 mil and the fabric surface transformed from a porous fibrous nature to almost continuous film surface on one side with substantially less porosity suitable for a use in disposable protective clothing or disposable medical articles.

Example 2

A non-woven polyvinyl alcohol fabric (20 mil thickness) was passed through a calendar as shown in FIG. 1 with the gap between the rolls set at 14 mils. The rolls were heated at 90° C. and a narrow slot of steam was directed at the top surface of the fabric just before the fabric passed through the rolls. A fine mist of water repellent coating was sprayed on the fabric after the fabric emerged from the calendar. The treated fabric was then passed through a drying oven to fix the water repellent coating on the surface of the fabric. The treated fabric was reduced in thickness to 14 mil and the fabric surface transformed from a porous fibrous nature to a continuous film surface with substantially less porosity suitable for a use in disposable protective clothing. Drops of water beaded and rolled off the surface of the fabric.

Example 3

A laminate of polyvinyl alcohol and polyethylene (20 mil thickness) was passed under a steam jet with steam of 100-120° C. impinging on the polyvinyl surface onto a conveyor as shown in FIG. 1. The conveyor transported the laminate through heated calendar rolls (100° C.) which was then sprayed with fluorocarbon water repellent agent and then passed through a drying oven. The laminate could be used in replacement of TYVEK®.

While the foregoing is illustrative of a preferred and a modified embodiment of the invention, other embodiments may be had within the scope hereof.

What is claimed is:

1. A method for selectively modifying a surface of polyvinyl alcohol film or fabric by selectively impinging steam on at least one surface comprising polyvinyl alcohol so as to soften and form a reduced porosity surface layer and treating said modified surface with a water repellant, said film or fabric being soluble at elevated temperatures.

2. The method of claim 1 wherein the film or fabric is a laminate with a polyolefin.

3. The method of claim 1 wherein the modified surface is treated with a member selected from the group consisting of colorant, fire proofing agent, and polymer.

4. The method of claim 1 wherein the temperature of the steam is about 100° to 120° C.

5. The method of claim 1 wherein both surfaces of polyvinyl alcohol are modified by impingement steam.

6. The method of claim 1 wherein the polyvinyl alcohol film or fabric includes a plasterizing agent.

7. A method for producing a polyvinyl alcohol film or fabric having at least one surface modified to have less porosity which comprises selectively impinging steam on said at least one surface so as to melt said surface and to reduce its porosity and treating said at least one surface layer with water repellant, said film or fabric being soluble in water at 80° to 90° C.

* * * * *